D. G. MacGREGOR, G. B. MILLEN, AND J. C. W. STANLEY.
METHOD AND APPARATUS FOR TREATING LIQUIDS.
APPLICATION FILED JUNE 17, 1920.
1,420,046.
Patented June 20, 1922.
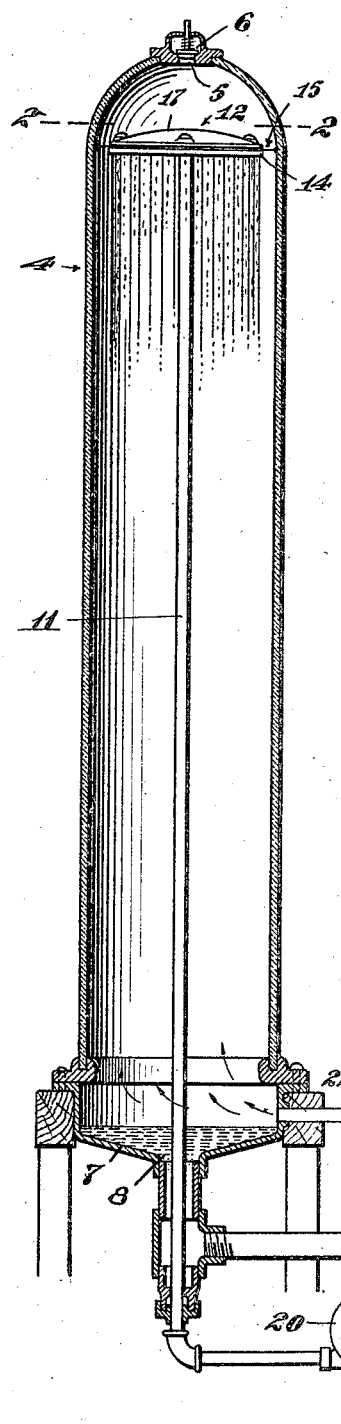
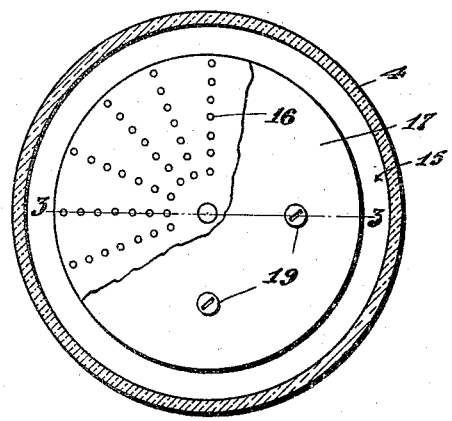
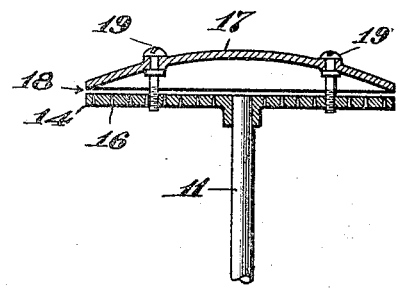
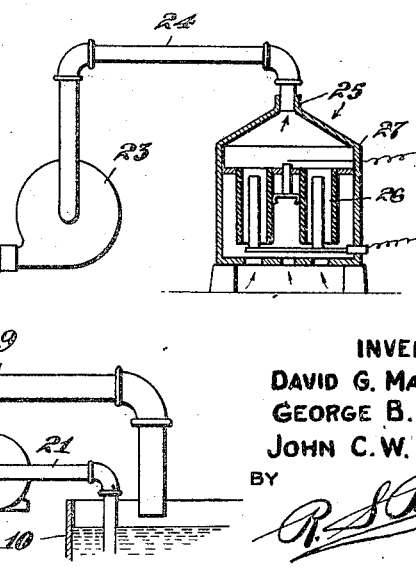
INVENTORS.
DAVID G. MAC GREGOR,
GEORGE B. MILLEN,
JOHN C. W. STANLEY:
BY
ATTORNEY.

UNITED STATES PATENT OFFICE.

DAVID G. MacGREGOR AND GEORGE B. MILLEN, OF WILMINGTON, AND JOHN C. W. STANLEY, OF SANTA CRUZ, CALIFORNIA, ASSIGNORS TO THE TITLE GUARANTEE AND TRUST COMPANY, OF LOS ANGELES, CALIFORNIA, A CORPORATION OF CALIFORNIA.

METHOD AND APPARATUS FOR TREATING LIQUIDS.

1,420,046.  Specification of Letters Patent.  Patented June 20, 1922.

Application filed June 17, 1920. Serial No. 389,791.

*To all whom it may concern:*

Be it known that we, DAVID G. MacGREGOR and GEORGE B. MILLEN, citizens of the United States, residing at Wilmington, in the county of Los Angeles, State of California, and JOHN C. W. STANLEY, subject of the King of England, residing at Santa Cruz, county of Santa Cruz, State of California, have invented new and useful Improvements in Methods and Apparatus for Treating Liquids, of which the following is a specification.

This invention particularly pertains to an apparatus and a method for treating liquids, and which is especially adapted for use in subjecting water, oils, syrups and the like, to the action of ozone.

An object of this invention is to provide a means whereby a liquid may be so intimately commingled with and exposed to ozone as to accomplish a thorough sterilization of the liquid, and effect deodorization and bleaching thereof.

Another object is to provide a method whereby a liquid may be subjected for a period of any suitable duration to the action of dilute ozone, embodying means by which a large volume of air and a relatively small volume of ozone may be thoroughly intermixed and passed into intimate contact with finely divided jets or sprays of liquid, and through a thin film of the liquid, in such manner as to insure a complete sterilizing action on the liquid.

A further object is to provide an apparatus whereby a liquid may be rained through a current of ozone laden air and at the same time be exposed to the action of the light rays.

Other objects will appear hereinafter.

The method embodying the invention and the apparatus for carrying same into effect is illustrated in the accompanying drawings, in which:—

Figure 1 is a view in vertical section of the apparatus.

Figure 2 is an enlarged horizontal section as seen on the line 2—2 of Figure 1 with parts broken away.

Figure 3 is a detail vertical section as seen on the line 3—3 of Figure 2.

In carrying out our invention we employ a tower 4 which is preferably cylindrical in form and made of glass or other suitable transparent material to permit the passage of light rays therethrough; the walls of the cylinder enclosing a chamber through which the liquid to be treated, together with ozone laden air, is passed as will be later described. An air outlet 5 is formed on the upper end of the chamber and is preferably fitted with a normally closed upwardly opening vent valve 6. The cylindrical wall of the tower seats on a basin 7 having an outlet opening 8 communicating with a discharge pipe 9 leading to a reservoir 10 containing the liquid to be treated. Extending upwardly centrally of the tower is a liquid discharge pipe 11, the upper end of which is fitted with a nozzle 12, here shown as embodying a circular baffle plate 14 arranged horizontally on the pipe 11 and extending across the chamber adjacent to its upper end; the plate having an outside diameter less than the internal diameter of the tower to form an annular gap or space 15 between the edge of the plate and the tower. The plate 14 is formed with a series of perforations 16 through which liquid delivered to the upper side of the plate may pass and be directed downwardly in thin streams, jets, or small drops; and caused to fall like rain through the chamber. A top plate 17 is mounted for vertical adjustment above the plate 14, having a diameter substantially corresponding to that of the baffle plate; the upper plate 17 being designed to be adjusted relative to the lower plate to form a continuous open space 18 between the peripheral edges of the plates through which liquid may be discharged horizontally in a thin film or sheet across the gap 15 and directed against the inner surface of the tower to flow downwardly on the latter. The adjustment of the plate 17 relative to the plate 14 is here shown as accomplished by means of set screws 19 which pass through the plate 17 and are screwed into engagement with the plate 14; the plate 17 being supported on the set screws.

The lower end of the pipe 11 connects with a pump 20 of any suitable description, the intake of which is fitted with a pipe 21 leading into the reservoir 10. Opening to the lower end of the tower, preferably through the basin 7, is an air and ozone discharge pipe 22 connecting with a fan or blower 23, the inlet of which is fitted with an intake pipe 24 connected with an ozonator 25 of any suitable construction, and which ozonator embodies the usual tubes 26 arranged in a housing 27, through which tubes air is drawn by the action of the blower 23 and ozone formed by subjecting the air flowing through the tubes 26 to the action of an electrical current, as is common in devices of this character. The blower is so designed that a relatively large volume of air will be caused to run through the ozonator in proportion to the volume of ozone formed, so that a small volume of ozone will be carried by a large volume of air, thus diluting the ozone.

In the operation of the invention the liquid to be treated is forced by the pump 20 upward through the pipe 11 to the nozzle 15 from whence it is discharged, as before described in drops or jets falling like rain from the under side of the baffle plate; and by a continuous film which passes across the gap 15, the liquid passing downwardly in the chamber in the tower to the basin and flowing back into the reservoir. The blower 23 is operated to discharge a large volume of air in proportion to the ozone formed in the ozonator into the lower end of the chamber, which mixture of the air and ozone will pass upwardly and be brought into intimate contact with the particles of the liquid passing downwardly in the chamber; the vent valve 6 operating to allow the air to pass out the upper end of the chamber and permit a flow of air and ozone throughout the length of the latter. By directing the film of the liquid horizontally between the nozzle and the inner wall of the chamber the air and ozone discharged from the chamber must pass through the film of liquid, this together with the fine division of the liquid effected by the perforations in the nozzle insures a thorough action of the ozone on the liquid. The walls of the tower or chamber being transparent admit light rays which in the treatment of some liquids is advantageous particularly where the apparatus is exposed to sun-light, as the rays of the sun assist the action of ozone on the liquid.

This invention is particularly applicable for use of sterilizing water and in bleaching and deodorizing oils, syrups and the like, but it may, obviously, be employed in subjecting other liquids with ozone as occasion may require.

While we have shown and described a specific embodiment of the invention, we do not limit ourselves to the exact details of construction shown, but may resort to various changes and modifications according to the varying conditions, without departing from the spirit of the invention as set forth in the appended claims.

We claim:—

1. An apparatus for treating liquids with ozone, comprising a chamber having transparent vertical walls, a basin forming the bottom of said chamber having an outlet, a liquid reservoir with which said outlet communicates, a pipe leading upward in said chamber, a pump for discharging liquid from said reservoir through said pipe, a nozzle on said pipe adapted to discharge a portion of the liquid against the walls of the chamber and to deliver another portion of the liquid downwardly clear of the chamber walls in rain-like streams, an ozonator, and means for passing air through said ozonator and through said chamber whereby the liquid in the chamber will be subjected to the action of ozone carried by the air.

2. The method of treating a liquid with ozone, consisting in creating a flow of ozone laden air through a sun illuminated chamber, and circulating a liquid through the air current and sunlight such length of time as to cause the ozone to act on the liquid.

In witness whereof we have hereunto affixed our signatures this 24th day of May, 1920.

DAVID G. MacGREGOR.
GEORGE B. MILLEN.
JOHN C. W. STANLEY.